(12) United States Patent
Walker et al.

(10) Patent No.: US 6,862,701 B2
(45) Date of Patent: Mar. 1, 2005

(54) DATA COMMUNICATION SYSTEM WITH SELF-TEST FACILITY

(75) Inventors: Richard C. Walker, Palo Alto, CA (US); Patricia A. Thaler, Carmichael, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 568 days.

(21) Appl. No.: 09/801,031

(22) Filed: Mar. 6, 2001

(65) Prior Publication Data

US 2002/0129307 A1 Sep. 12, 2002

(51) Int. Cl.[7] ............................................. G01R 31/28
(52) U.S. Cl. ....................................................... 714/715
(58) Field of Search ................................. 714/715, 712, 714/716, 717, 735, 736, 739, 762

(56) References Cited

U.S. PATENT DOCUMENTS

| | | | |
|---|---|---|---|
| 5,022,051 A | 6/1991 | Crandall et al. ............... 375/19 |
| 5,228,042 A | 7/1993 | Gauthier et al. | |
| 5,438,621 A | 8/1995 | Hornak et al. ................. 380/43 |
| 5,497,377 A | * 3/1996 | Muto et al. .................. 714/715 |
| 5,499,339 A | 3/1996 | Arweiler et al. | |
| 5,530,959 A | * 6/1996 | Amrany ....................... 380/268 |
| 6,148,194 A | 11/2000 | Kao et al. | |
| 6,618,395 B1 | * 9/2003 | Kimmitt ...................... 370/473 |
| 6,662,332 B1 | * 12/2003 | Kimmitt ...................... 714/762 |
| 6,742,182 B1 | * 5/2004 | Perlman ....................... 725/25 |

FOREIGN PATENT DOCUMENTS

WO    WO93/05593    3/1993

OTHER PUBLICATIONS

Widmer, A.X., and Franaszek, P.A., "A DC Balanced, Partitioned-Block, 8b/10b Transmission Code", IBM J. Res. and Dev., Sep. 1983.
Thaler, Pat and Walker, Rick, "An Optimized Self-Test Function for 64B/66b PCS" IEEE 802.3 AE, Agilent Technologies, Online, Mar. 12, 2001.
ITU-T: "ITU-T V.54: Loop Test Devices for Modems-Data Communication over the Telephone Network (Study Group XVII)" Jan. 1, 1989, XP002204476.

* cited by examiner

*Primary Examiner*—Albert Decady
*Assistant Examiner*—James C. Kerveros
(74) *Attorney, Agent, or Firm*—Ian Hardcastle (57) ABSTRACT

Self testing of a data communication system that includes a presettable scrambler and a complementary presettable descrambler is performed by presetting the presettable scrambler to a preset state. A seed payload field is scrambled using the presettable scrambler to generate fields of a test sequence. The fields of the test sequence are transmitted and corresponding received test sequence fields are received. The received test sequence fields are descrambled using the presettable descrambler to generate respective recovered test sequence fields. Differences between the recovered test sequence fields and the seed payload field are then detected as errors. In an embodiment, the seed payload field and the preset state of the presettable scrambler are chosen to generate a test sequence that imposes a known stress, such as a given run length, to the data communication system.

34 Claims, 6 Drawing Sheets

DATA COMMUNICATION SYSTEM WITH SELF-TEST FACILITY

BACKGROUND OF THE INVENTION

For several decades, integrated circuit and laser technologies have doubled in performance approximately every 18 months. These technologies have been used to support a rapidly-growing demand for global communications capacity. This demand is currently growing much faster than the underlying rate of improvement of the supporting technologies. As an example, communication traffic through the Internet has recently been doubling every nine months. The demand for additional communication bandwidth is severely stressing the capabilities of current electronic and optical technologies.

In particular, the Ethernet local area network standard has progressively increased in speed by factors of ten, starting at 10 megabit per second (Mb/s) in 1982. Proposals for a 10 gigabit/second (Gb/s) Ethernet standard were made in 1999. The most recently adopted Ethernet standard is for transmitting serial data at 1 Gb/s and uses a 8b/10b line code described by A. X. Widmer and P. A. Franaszek in *A DC-Balanced, Partitioned-Block, 8b/10b Transmission Code*, 27 IBM *J. RES. AND DEV.*, (1983 September). In 8b/10b line code, each eight-bit input word is represented by a ten-bit code that is transmitted through the Ethernet medium. In exchange for this 25% overhead, 8b/10b coding provides DC balance, and a guaranteed transition density. The ten-bit code additionally has the ability to represent an assortment of control words used for signaling and framing.

The large overhead of 8b/10b coding imposes operational disadvantages when applied to 10 Gb/s transmissions. In U.S. patent application Ser. No. 09/522,782, the disclosure of which is incorporated herein by reference, one of the inventors of this disclosure (Walker) and others disclosed a 64b/66b encoder/66b coding scheme that provided most of the advantages of 8b/10b coding, but with a substantially smaller overhead.

Figure 1:
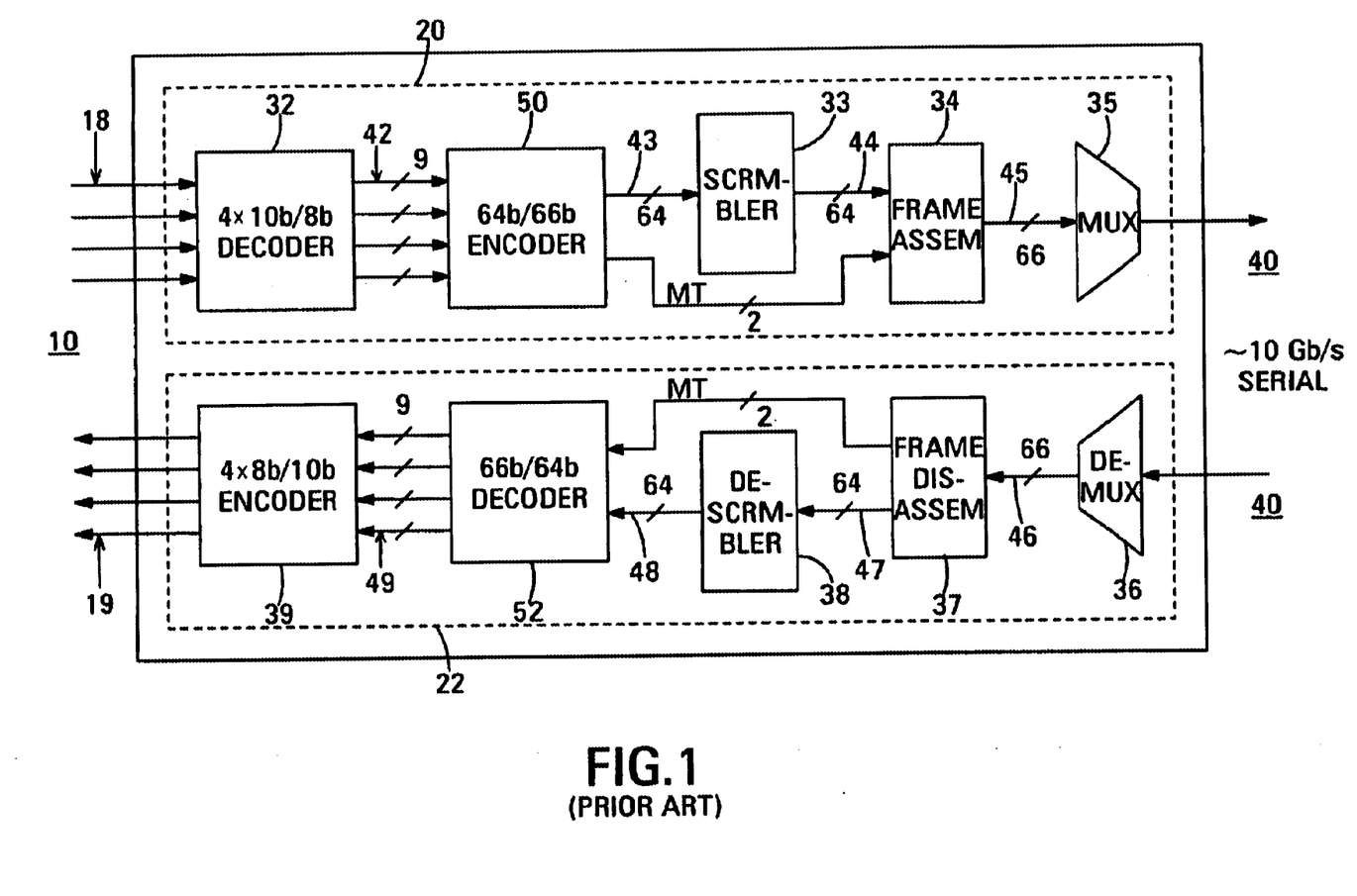
FIG. 1 is a block diagram showing an example of the 10 Gb/s Ethernet data communication system disclosed in the above-mentioned patent application.

FIG. 1 is a block diagram showing an example 10 of the 10 Gb/s Ethernet data communication system disclosed in the above-mentioned patent application. The data communication system receives a 4×8b/10b coded serial bitstream via the 4-lane XAUI bus 18 and outputs a 4×8b/10b coded serial bitstream via the 4-lane XAUI bus 19.

The data communication system 10 includes the transmitter 20 and the receiver 22. The transmitter 20 is composed of a serial arrangement of the 4×10b/8b decoder 32, the 64b/66b encoder 50, the scrambler 33, the frame assembler 34 and the multiplexer 35. The input of the 4×10b/8b decoder is connected to the XAUI bus 18. The output of the 4×10b/8b decoder is connected to the input of the 64b/66b encoder by the 37-conductor pseudo-XGMII bus 42.

The payload field output of the 64b/66b encoder 50 is connected to the input of the scrambler 33 by the payload field bus 43. The master transition output of the 64b/66b encoder is connected via the master transition bus MT to the master transition input of the frame assembler 34.

The output of the scrambler 33 is connected to the payload field input of the frame assembler 34 by the bus 44. The output of the frame assembler is connected to the input of the multiplexer 35 by the bus 45. The multiplexer generates a 10 Gb/s serial bitstream that is output to the Ethernet medium 40.

The receiver 22 is composed of a serial arrangement of the demultiplexer 36, the frame disassembler 37, the descrambler 38, the 66b/64b decoder 52 and the 4×8b/10b encoder 39.

The demultiplexer 36 receives a 10 Gb/s serial bitstream from the Ethernet medium 40. The output of the demultiplexer is connected to the input of the frame disassembler 37 by the bus 46.

The payload field output of the frame disassembler 37 is connected to the input of the descrambler 38 by the bus 47. The master transition output of the frame disassembler is connected to the master transition input of the 66b/64b decoder 52 by the bus MT.

The output of the descrambler 38 is connected to the payload field input of the 66b/64b decoder 52 by the bus 48.

The output of the 66b/64b decoder 52 is connected to the input of the 4×8b/10b encoder 39 by the 37-conductor pseudo-XGMII bus 49. The output of the 4×8b/10b encoder is connected to the XAUI bus 19.

The widths of the busses 43–48 shown in FIG. 1 are maximum parallel widths: serial/parallel techniques may be used to reduce the parallel widths of these busses substantially.

In the transmitter 20 of the data communication system 10, the 4×10b/8b decoder 32 is connected to the XAUI bus 18 to receive incoming serial 10-bit line code words at a bit rate of 4×3.125 Gb/s. The 4×10b/8b decoder decodes the 8b/10b coding of the 10-bit line code words to recover respective 8-bit words, and generates, a control word flag for each word that, when set, indicates that the word is a control word. The 4×10b/8b decoder sets of four of the 8-bit words and their respective control word flags to the 64b/66b encoder 50 via the pseudo-XGMII bus 42. In this disclosure, the term quad will be used to denote a set of four 8-bit words. The pseudo-XGMII bus is composed of 37 conductors of which thirty-two are allocated to the quads, four are allocated to the control word flags for the quads, and one is allocated to a clock signal.

The 64b/66b encoder 50 determines whether any of the eight control word flags belonging to two of the quads is set. When none of the control word flags is set, the quads are composed exclusively of information words, and the 64b/66b encoder generates a payload field composed of both of the quads. The 64b/66b encoder additionally generates the two-bit master transition with bits 0 and 1 in a first state. When at least one of the control word flags is set, the quads include at least one control word, and the 64b/66b encoder generates a payload field composed of a TYPE word and seven other words. The seven other words may be information words, compressed control words or both information words and compressed control words. The 64b/66b encoder additionally generates the two-bit master transition with bits 0 and 1 in a second state, opposite to the first state. The payload field structures will be described below with reference to FIGS. 2A–2C.

Regardless of the contents of the payload field and the sense of the master transition, the 64b/66b encoder 50 feeds the payload field to the scrambler 33 via its payload field output and the bus 43 and feeds the master transition, suitably pipelined, to the master transition input of the frame assembler 34.

The scrambler 33 scrambles the payload fields of the frames so that, when the frames are transmitted, the resulting bitstream is statistically DC balanced and additionally appears to be random. Scrambling the payload fields also enables the receiver to synchronize easily on the master transitions, which are not scrambled. In an embodiment of the data communication system 10, the scrambler scrambles the payload field using the polynomial $x^{58}+x^{39}+x^0$. Alternative polynomials that can be used include $x^{65}+x^{47}+x^0$, $x^{58}+x^{19}+x^0$ and $x^{65}+x^{18}+x^0$.

The frame assembler 34 receives the scrambled payload field from the scrambler 33 and the master transition from the 64b/66b encoder 50 and forms a 66-bit frame from the scrambled payload field and the master transition.

Figure 2A:
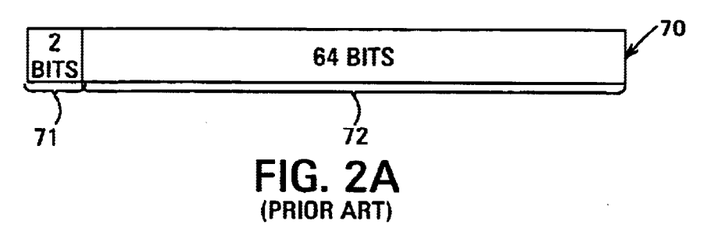
FIG. 2A shows the basic structure of the frame generated from two quads by the data communication system shown in FIG. 1.

FIG. 2A shows the basic structure of the frame 70 generated from two quads. Each quad is composed of four 8-bit words. The frame is composed of the two-bit master transition field 71 followed by the 64-bit payload field 72. The master transition field 71 accommodates the two-bit master transition. As noted above, the payload field is scrambled by the scrambler 33 the frame 70 is formed.

Figure 2B:
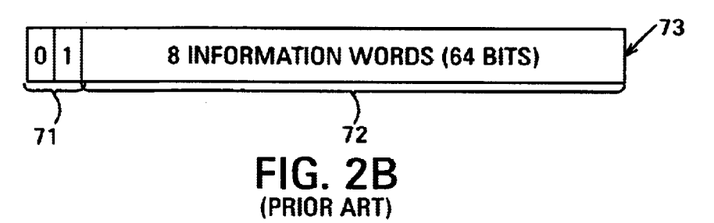
FIG. 2B shows the structure of the frame generated when the two quads are composed exclusively of information words.

Two different kinds of frame having the basic structure shown in FIG. 2A, but differing in the structure of their payload fields are generated. The structure of the payload field depends on whether or not the two quads are composed exclusively of information words. The structure of the payload field is indicated by the master transition stored in the master transition field. FIG. 2B shows the structure of the frame 73 generated when the two quads are composed exclusively of information words. In this, the master transition in the master transition field 71 is 01, and the payload field 72 is composed of the eight information words constituting the quads, i.e., 64 bits.

Figure 2C:
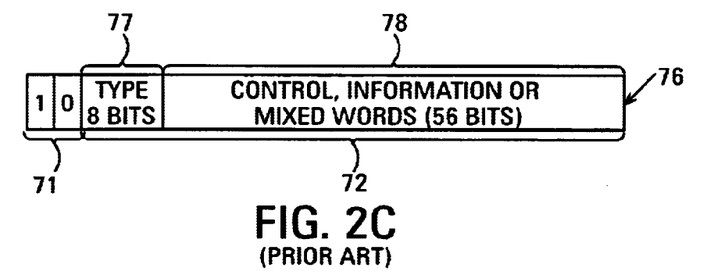
FIG. 2C shows the structure of the frame generated when the quads include at least one control word.

FIG. 2C shows the structure of the frame 76 generated when the quads include at least one control word. In this, the master transition in the master transition field 71 is 10, and the payload field 72 is composed of the eight-bit sub-field 77 and the 56-bit sub-field 78. The eight-bit sub-field is occupied by a TYPE word and the 56-bit sub-field is occupied by a compressed version of the quads. In particular, all information words included in the quads are included unchanged in the 56-bit sub-field. The 56-bit sub-field can accommodate up to seven information words, the maximum number of information words in two quads that include at least one control word. Moreover, the start-of-packet control word S and the end-of-packet control word T, if they appear in the quads, are discarded and are not transferred to the 56-bit sub-field. Instead, the value of the TYPE word indicates the presence and position of the control word S or the control word T. Finally, all remaining control words in the quads are compressed by re-coding them using fewer than eight bits and the re-coded control words are included in the 56-bit sub-field. In an embodiment, the remaining control words are re-coded using seven-bit codes chosen to have a mutual Hamming distance of four bits.

Returning now to FIG. 1, the multiplexer 35 receives the 66-bit frames from the frame assembler 34 and serializes them for transmission through the Ethernet medium 40 at a bit rate of 10 Gb/s.

In the receiver 22 of the data communication system 10, the demultiplexer 36 receives the serial data stream having a bit rate of 10 Gb/s from the Ethernet medium 40. The demultiplexer partitions the bitstream into 66-bit frames, and feeds the frames to the frame disassembler 37.

The frame disassembler 37 operates on each frame to separate the master transition from the scrambled payload field, and feeds the master transition, suitably pipelined, to the master transition input of the 66b/64b decoder 52. The frame disassembler also feeds the scrambled payload field to the descrambler 38.

The descrambler 38 descrambles the scrambled payload field using self-synchronizing descrambling complementary to the scrambling performed by the scrambler 33. The descrambler feeds the resulting recovered payload field to the payload field input of the 66b/64b decoder 52.

The 66b/64b decoder 52 decodes the recovered payload field in response to the corresponding master transition received from the frame disassembler 37. When the master transition is in its first state, the 66b/64b decoder simply outputs the eight words in the payload field as two consecutive quads. The 66b/64b additionally outputs a control word flag for each word in the quads. When the master transition is in its second state, the 66b/64b decoder reconstitutes the two quads from which the original frame was generated before outputting them together with a control word flag for each word in the quads. The 66b/64b decoder reconstitutes the two quads by reading the TYPE word and expanding any compressed control words in the field. Additionally, when the TYPE word indicates that either the start-of-packet control word S or the end-of-packet control word T was discarded by the 64b/66b encoder 50, the 66b/64b decoder additionally inserts a start-of-packet control word or an end-of-packet control word into the location in the quad indicated by the TYPE word.

The 66b/64b decoder 52 transfers the quads and their respective control word flags in parallel to the 4×8b/10b encoder 39 via the pseudo-XGMII bus 49.

The 4×8b/10b encoder 39 applies 8b/10b encoding to the quads received via the pseudo-XGMII bus 43, operating in response to the control word flag for each word constituting the quads. The 4×8b/10b encoder outputs the resulting 10-bit line code words via the XAUI bus 19.

It is customary to equip data communication systems with a self-test facility to enable the proper operation of the data communication system to be confirmed. Conventionally, the data communication system is tested by transmitting a test sequence composed of known sequence of random bit patterns through the data communication system and detecting errors at the receiver. The receiver may be co-located with the transmitter or may be remotely located.

Figure 3:
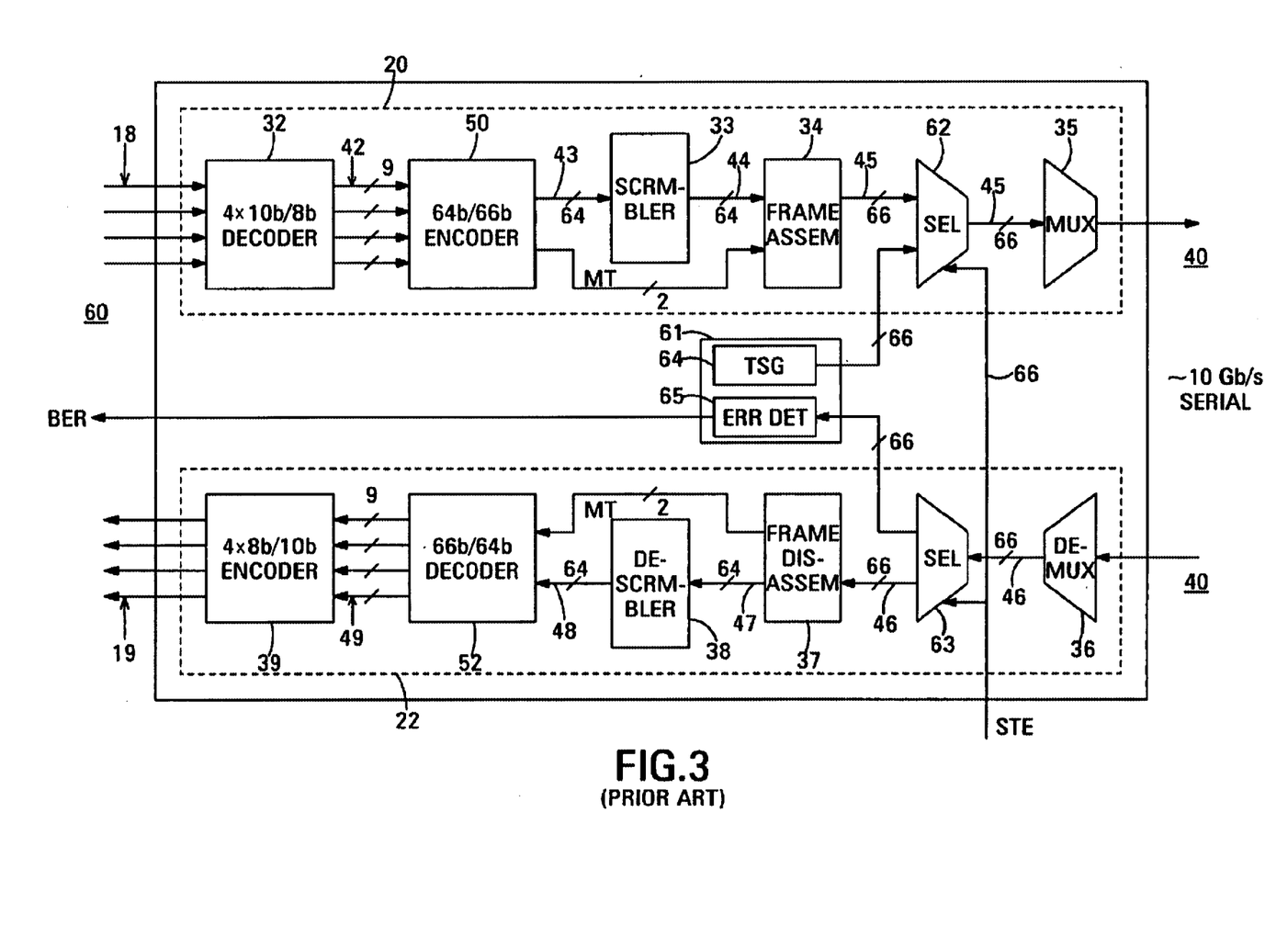
FIG. 3 is a block diagram showing an example of the data communication system shown in FIG. 1 incorporating a conventional self-test facility.

FIG. 3 is a block diagram showing an example 60 of a data communication system incorporating a conventional self-test facility. The data communication system 60 is based on the communication system 10 shown in FIG. 1, and elements of the data communication system 60 that correspond to elements of the data communication system 10 are indicated by the same reference numerals and will not be described again here.

The data communication system 60 additionally includes the bit error rate tester 61, the selector 62 and the selector 63. Bit error rate testers are known in the art. The example of the bit error rate tester 61 shown includes the test sequence generator 64 and the error detector 65.

The selector 62 has two data inputs, a control input and a data output. One data input is connected to the output of the frame assembler 34. The other data input is connected to the output of the test sequence generator 64. The control input is connected to the control line 66. The data output is connected to the input of the multiplexer 35.

The selector 63 has a data input, a control input and two data outputs. The data input is connected to the output of the demultiplexer 36. The control input is connected to the control line 66. One data output is connected to the input of the frame disassembler 37. The other data output is connected to the input of the error detector 65.

When the self-test enable control signal STE on the control line 66 is not asserted, the selector 62 connects the output of frame assembler 34 to the input of the multiplexer 35, and the selector 63 connects the output of the multiplexer 36 to the input of the frame disassembler 37. In this state, the data communication system 60 operates as described above. When the STE control signal is asserted, the selector 62 connects the output of the test sequence generator 64 to the input of the multiplexer 35, and the selector 63 connects the output of the demultiplexer 36 to the input of the error detector 65. The error detector synchronizes automatically to the received test sequence output by the demultiplexer and generates an error signal each time the received test sequence includes an error. The error detector may count the number of errors occurring in a predetermined time or during receipt of a predetermined number of bits to generate a bit error rate.

A commonly-available test sequence generator that can be used as the test sequence generator 64 generates a test sequence composed of $2^{31}-1$ (about 2.14 billion) bits. With a clock speed of 10 GHz, the test sequence has a cycle time of about 0.2 seconds, which is a convenient cycle time for most testing most types of data communication system. The test sequence generator outputs the test sequence in frames of 66 bits compatible with the input of the multiplexer 35.

However, a $2^{31}$-bit test sequence has a maximum run length of 31 bits. A run length of 31 bits occurs in normal 64b/66b encoded bitstreams more often than once in $10^{10}$ bits. As a result, a $2^{31}$-bit test sequence does not adequately test the error floor. A test sequence generator that generates a longer test sequence could be used, but at the expense of a substantially longer cycle time. The cycle time of a $2^{58}$-bit test is about 333 days. This would make it difficult to repeat a part of the test sequence that caused the data communication system to fail.

Another disadvantage of the conventional test sequence generator is that the test sequence looks like an error to any receiver in the data communication system not in self-test mode. Some receivers may require significant time to recover from such an error state.

A further disadvantage is that the test sequence is introduced into the transmitter 20 downstream of the frame assembler 34, so that the test sequence does not test the synchronization acquisition capability of the demultiplexer 36.

Finally, the bit error rate tester 61 and the selectors 62 and 63 collectively add substantial circuit complexity to the data communication system 10.

Thus, what is needed is a self-test facility that employs a test sequence that has a run length long enough to test adequately the error floor of a high-quality data communication system.

What is also needed is a self-test facility that generates a test sequence having a short cycle time.

What is also needed is a self-test facility that generates a test sequence that does not appear as an error to receivers not in a self-test mode.

What is also needed is a self-test facility that generates a test sequence that additionally tests the synchronization ability of the demultiplexer.

SUMMARY OF THE INVENTION

The invention provides a method for self testing a data communication system that includes a presettable scrambler and a complementary presettable descrambler. In the method, the presettable scrambler is preset to a preset state. A seed payload field is scrambled using the presettable scrambler to generate fields of a test sequence. The fields of the test sequence are transmitted and corresponding received test sequence fields are received. The received test sequence fields are descrambled using the presettable descrambler to generate respective recovered test sequence fields. Differences between the recovered test sequence fields and the seed payload field are then detected as errors.

The combination of the preset state and the seed payload field causes the presettable scrambler to generate the test sequence to include a desired bit sequence. The seed payload field may be one of a sequence of different seed payload fields that, when scrambled, generate the test sequence to include corresponding different desired bit patterns.

The presettable scrambler may be preset to the preset state by detecting an end bit sequence in the test sequence and presetting the presettable scrambler to the preset state when the end bit sequence is detected.

The method may additionally include detecting the end bit sequence in the recovered test sequence fields and presetting the presettable descrambler to the preset state when the end bit sequence is detected.

The invention also provides a method of generating a test sequence in a data transmitter that includes a scrambler. In the method, in a normal operating mode, payload fields are scrambled using the scrambler to generate respective scrambled payload fields, and the scrambled payload fields are transmitted. Then, in a self-test operating mode, a seed payload field is scrambled using the scrambler to generate fields of the test sequence, and the fields of the test sequence are transmitted.

The scrambler may be a presettable scrambler. In this case, the presettable scrambler is preset to a preset state, and a combination of the preset state and the seed payload field causes the presettable scrambler to generate the test sequence to include a desired bit pattern.

The invention also provides a method self-testing a data receiver that includes a descrambler. In the method, in a normal operating mode, scrambled payload fields are received as received payload fields, and the received payload fields are descrambled using the descrambler. Then, in a self-test operating mode, received test sequence fields generated by scrambling a seed payload field are received, the received test sequence fields are descrambled using the descrambler to generate respective recovered test sequence fields, and differences between the recovered test sequence fields and the seed payload field are detected as errors.

The invention also provides a data communication system having a built-in self-test facility. The data communication system comprises a seed payload field source, a presettable scrambler, a presettable descrambler and an error detector. The presettable scrambler includes an input connected to the seed payload field source and an output coupled to a data transmission medium. The presettable scrambler is presettable to a preset state. The presettable descrambler includes an input coupled to the transmission medium and an output. The error detector includes an input connected to the output of the presettable descrambler, and operates to generate an error indication when a recovered test sequence field output by the presettable descrambler differs from the seed payload field.

The data communication system may additionally comprise a detector and a controller. The detector detects an end bit sequence generated by the presettable scrambler. The controller operates in response to the detector to preset the presettable scrambler to the preset state. The data communication system may additionally comprise an additional detector and an additional controller. The additional detector detects the end bit sequence at the input of the presettable descrambler. The additional controller operates in response to the detector to preset the presettable descrambler to the preset state.

The invention also provides a data transmitter having a self-test facility. The data transmitter comprises a payload field source, a seed payload field source and a scrambler. The scrambler operates in a normal operating mode to receive payload fields from the payload field source and to scramble the payload fields to generate respective scrambled payload fields for transmission, and alternatively operates in a self-test mode to receive a seed payload field from the seed payload field source and to scramble the seed payload field to generate fields of a test sequence for transmission.

The scrambler may be a presettable scrambler capable of being preset to a preset state, in which case, a combination of the preset state and the seed payload field causes the presettable scrambler to generate the test sequence to include a desired bit pattern.

Finally, the invention provides a data receiver having a self-test facility. The data receiver comprises a descrambler and an error detector. The descrambler includes an output, and operates in a normal operating mode to descramble received payload fields to generate respective recovered payload fields, and alternatively operates in a self-test operating mode to descramble received test sequence fields generated by scrambling a seed payload field to generate respective recovered test sequence fields. The error detector includes an input connected to the output of the descrambler. The error detector operates to generate error indications when the recovered test sequence fields differ from the seed payload field.

The descrambler may be a presettable descrambler, in which case, the data receiver additionally comprises a controller that operates occasionally to preset the presettable descrambler to preset state.

DETAILED DESCRIPTION OF THE INVENTION

The invention is based on the observation that the test sequence generator 64 of the conventional bit error rate tester 61 shown in FIG. 3 has substantial circuit commonality with the scrambler 33 used to scramble the payload fields in the data communication system 60. The invention is based on the realization that, if the existing scrambler could be used to generate a test sequence, a self-test facility could be provided more simply and less expensively than the conventional approach shown in FIG. 3.

In a first aspect of the invention, in the self-test operating mode of the data communication system, the existing scrambler, e.g. the scrambler 33 shown in FIG. 1, is fed with a seed payload field. The existing scrambler is used in the normal operating mode to scramble the payload fields. The scrambler 33 scrambles the seed payload field to generate the fields of a test sequence. Each of the fields is filled with pseudo-random bits. A master transition is added to each field of the test sequence and the resulting 66-bit frames are transmitted.

In the receiver, the test sequence fields are extracted from the received frames as received test sequence fields and the received test sequence fields are descrambled using the existing descrambler, e.g., the descrambler 38 shown in FIG. 1. The existing scrambler is used in the normal operating mode to descramble the scrambled payload fields. Descrambling the received test sequence fields results in recovered test sequence fields that are identical to the seed payload field when there are no transmission errors. Differences between the recovered test sequence fields and the seed payload field are detected as transmission errors. Thus, the invention provides a self-test facility without the need to provide a separate test sequence generator.

In an embodiment, a 58-bit scrambler is used as the scrambler 33 to prevent malicious jamming. As noted above, the test sequence generated by a 58-bit scrambler has too long a cycle time to be practical for testing most data communication systems. A second aspect of the invention overcomes this disadvantage by using a presettable 58-bit scrambler to generate the test sequence instead of the conventional 58-bit scrambler 33. The presettable scrambler is preset to a preset state at the start of generating the test sequence, and is again preset to the preset state after it has generated a test sequence of a predetermined number of bits. For example, the presettable scrambler can be preset to its preset state after generating a test sequence of $2^{31}$ bits. Such a test sequence has a cycle time of about 0.21 seconds, which is an acceptable cycle time for testing most data communication systems.

The presettable scrambler can be configured to detect when it has generated the final bits that constitute the end of a test sequence composed of the predetermined number of bits. These bits will be called the end bit sequence of the test sequence. The presettable scrambler can additionally be configured to preset itself when it detects the end bit sequence.

Using a presettable scrambler as the 58-bit scrambler and repetitively presetting the presettable scrambler to the preset state in accordance with the invention overcomes additional disadvantages of conventional test sequence generators. The invention enables the test sequence to be generated with a desired bit pattern appearing at a predetermined point therein. The desired bit pattern can be used to test specific performance characteristics of the data communication system. For example, the desired bit pattern can be one that thoroughly tests the noise floor of a high-quality data communication system. Such a desired bit pattern would be one having a run-length substantially longer than 31 bits.

For example, by appropriately choosing the content of the seed payload field received by the presettable 58-bit scrambler and by additionally choosing the preset state to which the presettable scrambler is preset, the test sequence can be configured to begin with a desired bit pattern having a run length of 46 zeroes. A different preset state can make the 46-bit run length sequence appear later in the test sequence. A different seed payload field can be used to provide a run-length of ones or zeroes up to a maximum run-length equal to the length of the scrambler. A sequence of two or more different seed payload fields can be fed to the presettable scrambler during each test sequence to cause the presettable scrambler to generate the test sequence to include corresponding different desired bit patterns.

Another advantage of using a presettable scrambler as the 58-bit scrambler and using the presettable scrambler to generate the test sequence is that the test sequence fields output by the presettable scrambler are fed to the frame assembler 34 which forms 66-bit frames from the test sequence fields and their respective master transitions. As a result, the bitstream generated by the transmitter in its self-test mode appears to any receiver as a normal bitstream, regardless of whether or not the receiver is in its self-test mode. Moreover, the test sequence tests the synchronization capabilities of the demultiplexer in the receiver.

A presettable descrambler is used as the 58-bit descrambler in the receiver. The presettable descrambler locks to the received test sequence after 58 bits have been received. Once locked, the presettable descrambler descrambles the received test sequence fields using descrambling complementary to the scrambling applied by the presettable scrambler 133. As a result, when there are no transmission errors, the output of the presettable descrambler is a sequence of recovered test sequence fields identical to the seed payload field fed to the presettable scrambler. A transmission error is identified determining whether any of the recovered test sequence fields output by the presettable descrambler differs from the seed payload field.

Figure 4:
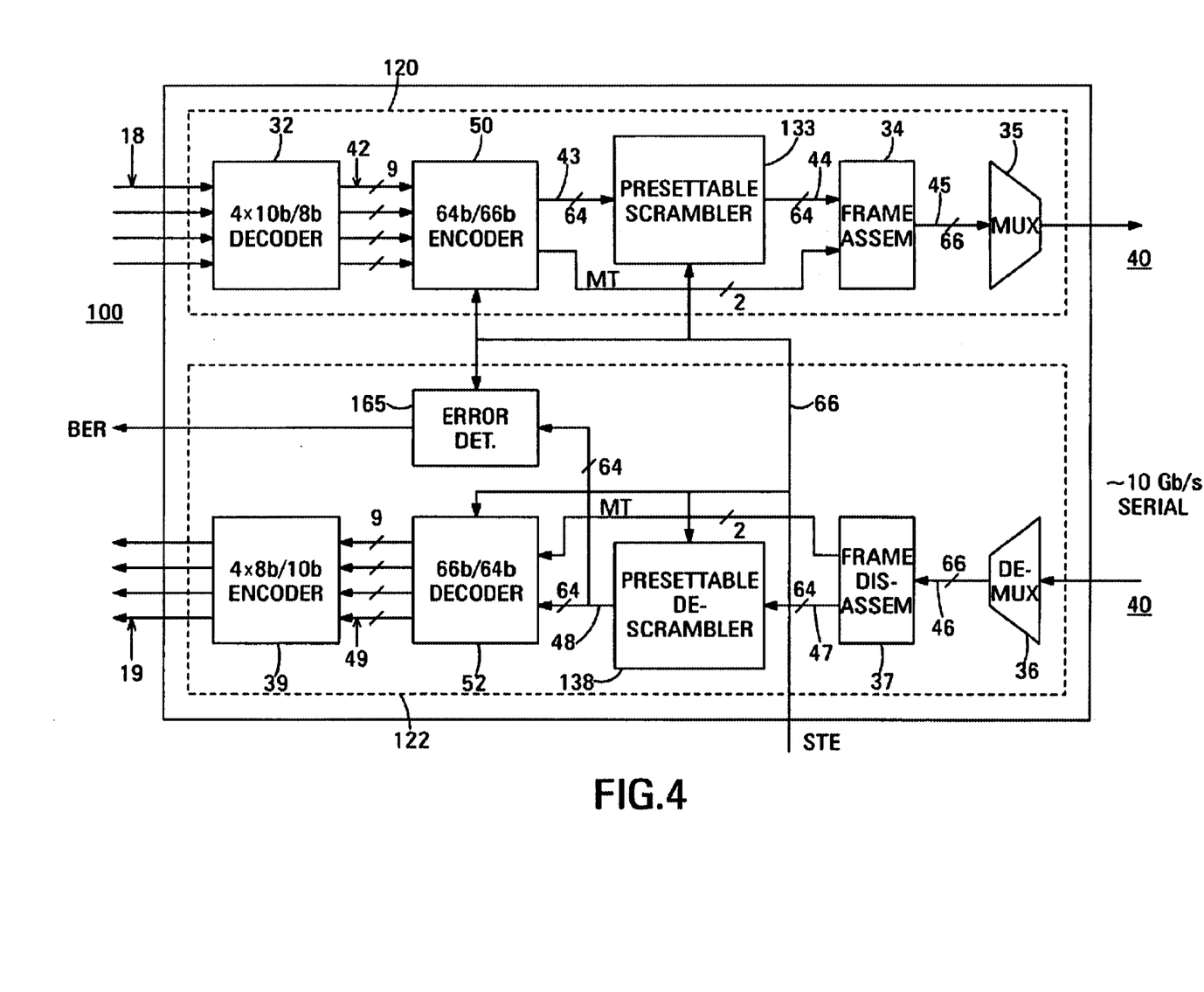
FIG. 4 is a block diagram showing an example of a 10 Gb/s Ethernet data communication system according to the invention. The data communication system includes a self-test facility.

FIG. 4 is a block diagram showing an example 100 of a 10 Gb/s Ethernet data communication system according to the invention. The data communication system includes a self-test facility. Elements of the data communication system shown in FIG. 4 that correspond to the data communication system shown in FIG. 1 will be indicated by the same reference numerals and will not be described again.

The digital transmission system 100 includes the transmitter 120 according to the invention and the receiver 122 according to the invention. The transmitter includes the presettable scrambler 133 and the receiver includes the presettable descrambler 138 and the error detector 165.

The input of the resettable scrambler 133 is connected to the payload field output of the 64b/66b encoder 50 by the bus 43. The output of the resettable scrambler is connected to the payload field input of the frame assembler 34 by the bus 44. The input of the presettable descrambler 138 is connected to the payload field output of the frame disassembler 37 by the bus 47. The output of the presettable descrambler is connected to the payload field input of the 66b/64b decoder 52 by the bus 48. The output of the presettable descrambler is also connected to the input of the error detector 165.

The control line 66 is connected to control inputs on the presettable scrambler 133, the presettable descrambler 138, the 64b/66b encoder 50, the 66b/64b decoder 52 and the error detector 165.

The data communication system 100 has a normal operating mode and a self-test operating mode. In the normal operating mode, the STE control signal on the control line 66 is not asserted. This causes the 64b/66b encoder 50 to operate as described above and additionally sets the presettable scrambler 133 to its conventional operating mode in which the above-described end bit sequence does not preset the presettable scrambler. With the 64b/66b encoder and the presettable scrambler operating as just described, the 64b/66b encoder encodes blocks of data received via the XAUI bus 18 to generate payload fields, and the presettable scrambler scrambles the payload fields to generate respective scrambled payload fields. The scrambled payload fields are formed into frames that are serialized and transmitted to the Ethernet medium 40.

In addition, non-assertion of the STE control signal causes the 66b/64b decoder 52 to operate as described above, and sets the presettable descrambler 138 to its conventional operating mode in which the above-described end bit sequence does not preset the presettable scrambler. With the 66b/64b decoder and the presettable descrambler operating as described, a serial bitstream received from the Ethernet medium 40 is segmented into frames. Scrambled payload fields and master transitions are extracted from the frames and the payload fields are descrambled by the presettable descrambler to generate respective recovered payload fields. The 66b/64b decoder decodes the recovered payload fields in response to the corresponding master transitions to generate blocks of data for output via the XAUI bus 19. Finally, the control signal disables the error detector 165.

In the self-test operating mode, the STE control signal on the control line 66 is asserted. The STE control signal causes the 64b/66b encoder 50 to operate as the source of a seed payload field in which all the words are set to a predetermined state. In an embodiment, the seed payload field was composed of the words $55_H\ 00_H\ 00_H\ 01_H\ 00_H\ 00_H\ 00_H\ 01_H$ that collectively indicate a Local Fault. This seed payload field will be called the Local Fault payload field. Some embodiments of the 64b/66b encoder are configured to operate in response to a control signal to generate a Local Fault payload field autonomously. In this case, the STE control signal can be used to activate this feature, or a command can be transmitted via the XAUI bus to cause the 64b/66b encoder to generate the Local Fault payload field. Using the Local Fault payload field as the seed payload field has the advantage that it causes receivers not in their self-test operating mode to ignore the test sequence. An alternative seed payload field is an Idle Payload field composed of the control words that indicate an idle condition.

The 64b/66b encoder 50 additionally generates a master transition for each seed payload field and feeds the master transition to the master transition input of the frame assembler 34 via the bus MT.

During the time that the STE control signal on the control line 66 is asserted, the 64b/66b encoder repetitively outputs the seed payload field and its master transition to the presettable scrambler 33 and the frame assembler 34, respectively. The rate as which the seed payload field and its master transition are output is the same as that at which the payload fields and their master transitions are output in the normal operating mode.

Assertion of the STE control signal additionally switches the presettable scrambler 133 to its preset operating mode. The change of state of the STE control signal additionally presets the presettable scrambler to its preset state. In its preset operating mode, the presettable scrambler monitors the test sequence to detect the end bit sequence that indicates the end of the test sequence, and presets itself to the preset state each time it detects the end bit sequence.

In an embodiment, the presettable scrambler is preset by setting the following 58-bit number into the presettable scrambler 133 as the preset state: 10101111 11111111 11100000 10111111 11111100 00000111 11111111 10 in which the left-most bit is the oldest bit of state and the right-most bit is the newest bit of state.

In this embodiment, the combination of the preset state and the seed payload field described above causes the presettable scrambler 133 to generate a test sequence that begins with a desired bit pattern composed of a 46-bit run length of zeroes. A different preset state may be used to cause the presettable scrambler to generate the test sequence with a different desired bit pattern. Different desired bit patterns may be used to test different aspects of the performance of the data communication system. For example, the desired bit pattern composed of a 46-bit run length of zeroes may be located later in the test sequence. Other values of the preset state and the seed payload field may be used to generate a desired bit pattern having any desired run-length of ones or zeroes up to the number of stages in the presettable scrambler. As a further example, the test sequence can be generated to include a desired bit pattern that invokes a specific baseline wander condition, e.g., a maximum baseline wander or a minimum baseline wander. Finally, a sequence of two or more different seed payload fields may be fed to the presettable scrambler during generation of the test sequence to generate the test sequence to include corresponding different desired bit patterns. In this disclosure, the term a seed payload field will be understood to encompass a seed payload field that is part of a sequence of two or more seed payload fields.

The seed payload field fed to the presettable scrambler may be changed to a different seed payload field when the presettable scrambler is reset in response to the end bit sequence being detected. The changed seed payload field changes the end bit sequence that occurs in the test sequence after the predetermined number of bits has been detected.

The presettable scrambler 133 feeds 64-bit fields of the test sequence to the payload field input of the frame assembler 34. The frame assembler forms 66-bit frames from the test sequence fields received from the presettable scrambler 133 and their respective master transitions received from the 64b/66b encoder 50 and feeds the 66-bit frames to the multiplexer 35. For example, the frame assembler may append each test sequence field to its master transition, as illustrated in FIG. 2A.

However, the master transition can be embedded in the test sequence field in an arbitrary way as long as the arbitrary way is known to the receiver. Moreover, in a data communication system that does not employ master transitions to provide information about the payload field, an arbibrary sync pattern can be embedded in, or appended to, the test sequence field in an arbitrary way as long as the receiver knows the sync pattern and the arbitrary way. The sync pattern can be any stable computably-checkable pattern. For example, a parity bit of the payload field can be used as the sync pattern. In this case, the receiver would shift the phase of the demultiplexer 36 until it found a stable bit that agreed with the parity of the payload field.

The multiplexer 35 generates a serial bit stream from the 66-bit frames and feeds the bitstream to the Ethernet medium 40.

In the receiver 122, the demultiplexer 36 partitions the serial bit stream received from the Ethernet medium 40 into 66-bit frames, and feeds the frames to the frame disassembler 37. The frame disassembler 37 processes each frame to separate the master transition from the received test sequence field, and feeds the master transition to the master transition input of the 66b/64b decoder 52. The frame disassembler also feeds the received test sequence field to the presettable descrambler 138.

The STE control signal switches the presettable descrambler 138 into its preset operating mode. In the preset operating mode, the presettable descrambler descrambles the received test sequence fields received from the frame disassembler 37 to generate respective recovered test sequence fields. The presettable descrambler additionally monitors the received test sequence fields to detect the end bit sequence, and presets itself to the same preset state as the presettable scrambler 133 each time it detects the end bit sequence. The presettable descrambler feeds the recovered test sequence fields to the 66b/64b decoder 52 and to the error detector 165.

The STE control signal sets the 66b/64b decoder to ignore the recovered test sequence fields output by the presettable descrambler 138. The STE control signal also activates the error detector 165. The error detector examines the recovered test sequence fields received from the presettable descrambler. When the data communication system is error-free, each recovered test sequence field is identical to the seed payload field described above. The error detector detects whether each recovered test sequence field is different from the seed payload field and counts the number of test sequence fields detected to be in error as bad test sequence fields to provide an estimate of the bit error rate. Alternatively, the error detector may detect and count each difference between the recovered test sequence fields and the seed payload field. When this is done, since the presettable descrambler multiplies the effect of any bit error by as many as three, the error detector divides the error count by three to estimate the bit error rate.

Figure 5A:
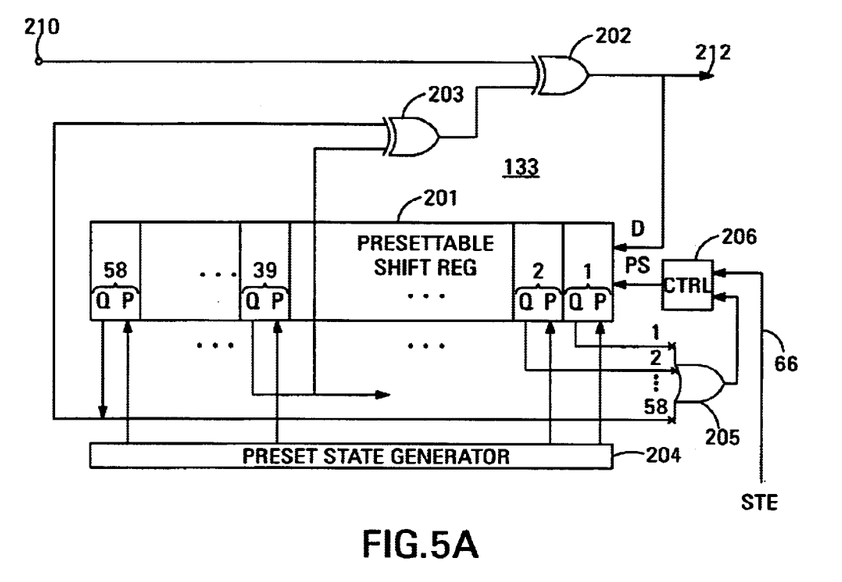
FIG. 5A is a block diagram showing an example of a serial version of the presettable scrambler of the data communication system shown in FIG. 4.

The FIG. 5A is a block diagram showing an example of a serial version of the presettable scrambler 133 that scrambles using the polynomial $x^{58}+x^{39}+x^0$. Modifications to the example to implement scrambling using other polynomials will be apparent to the person of ordinary skill in the art. The presettable scrambler is composed of the shift register 201, the exclusive-OR (XOR) gates 202 and 203, the preset state generator 204, the N-input AND gate 205 and the controller 206. N is the number of stages in the shift register.

A multiplexer (not shown) forms a serial bitstream from the seed payload field received from the 64b/66b encoder 50 (FIG. 4). The serial bitstream is received at the input 210, which is connected to one input of the XOR gate 202. The other gate input of the XOR gate 202 is connected to the output of the XOR-gate 203. The output of the XOR gate 202 is connected to the output 212, and also to the data input D of the shift register 201. The scrambled serial bitstream output at the output 212 passes via a demultiplexer (not shown) to the frame assembler 34 (FIG. 4).

The preset state generator 204 is composed of 58 state generators, each of which is set to 0 or to 1 in accordance with the corresponding digit of the 58-bit preset state. In the example of the preset state discussed above, the preset state generator sets the preset inputs P of stages 1 through 58 to 01 11111111 11100000 00111111 11111101 00000111 11111111 11110101, respectively. Circuit blocks for generating a predetermined set of states are known in the art and will not be described here.

FIG. 5A shows four exemplary stages, 1, 2, 39 and 58 of an example of the shift register 201 that has 58 stages. Each stage is presettable to the state set on its preset input P. Each stage has a data output Q. The preset input P of each stage of the shift register 201 is connected to a different one of the outputs of the preset state generator 204.

The data output Q of each stage of the shift register 201 is connected to a different one of the inputs of the N-input AND gate 205. The N-input AND gate is configured to detect when the end bit sequence appears on the outputs of the shift register. Each input of the AND gate 205 is inverting or non-inverting (indicated by the x-symbols) depending on the 1s and 0s of the end bit sequence. When the shift register has 58 stages, the N-input AND gate 205 is a 58-input gate, and the end bit sequence is the last 58 bits of the test sequence. When the end bit sequence appears on the outputs of the shift register, an input of the gate connected to an output in the 0 state is inverting and an input connected to an output in the 1 state is non-inverting. For example if bits 1, 2 and 58 of the end bit sequence are 010, gate inputs 1 and 58 are inverting and input 2 is non-inverting.

The output of the N-input AND gate 205 is connected to one input of the controller 206. The other input of the controller receives the self test enable control signal STE via the control line 66. The output of the controller is connected to the preset input PS of the shift register 201.

The data outputs Q of stages 39 and 58 of the shift register 201 are additionally connected to the inputs of the XOR gate 203.

In the normal operating mode of the data communication system 100, the low state of the control signal STE holds the output of controller 206 low, which holds the preset input PS of the shift register 201 low. This inhibits any presetting of the contents of the shift register 201 and the presettable scrambler 133 scrambles the payload fields received from the 64b/66b encoder 50 using the polynomial $x^{58}+x^{39}+x^0$.

In the self-test operating mode, the seed payload field is present at the input of the presettable scrambler 133. The control signal STE is in its high state. The change of state of the controller signal STE causes the output of the controller 206 to change state for one clock cycle. The high state of the preset input PS of the shift register 201 loads the state on the preset input P of each stage into the stage, and transfers the state to the data output Q of the stage. When the preset input returns to its low state, the presettable scrambler scrambles the Local Fault payload field starting with the shift register 201 preset to the preset state. In the example described above, the first 46 digits output are all zeros.

The presettable scrambler 133 continues to scramble the Local Fault payload field until the last 58 bits output correspond to the end bit sequence described above. For example, the last 64 bits output by the presettable scrambler at the end of a test sequence of $2^{31}$ bits is (40 2B BA 29 1E 44 6E DD)$_H$.

When the last 58 bits output by the presettable scrambler 133 are the end bit sequence, the end bit sequence additionally appears on the data outputs Q of the shift register 201. This causes the output of the N-input AND gate 205, the output of the controller 206 and the preset input PS of the shift register 201 all to go high. The high state of the preset input PS once more loads the state on the preset input P of each stage into the stage and sets the data output Q of each stage to the state of the preset input. The change in the states of the data outputs Q of the shift register causes the output of the N-input AND gate to go low. The low state of the N-input AND gate output returns the output of the controller and the preset input PS of the shift register to their low states, and the cycle repeats.

The output of the controller 206 may be used to change the seed payload field fed to the presettable scrambler 133 when the presettable scrambler is preset. This enables the test sequence generated after the preset to include a different desired bit pattern from the test sequence generated before the preset. Two different seed payload fields may alternate. Alternatively, a loop consisting of a sequence of more than two seed payload fields, at least two of which are different, may be used.

When the seed payload field is changed, the end bit sequence of the test sequence also changes. In this case, the presettable scrambler 133 may include more than one N-input gate. Each N input gate detects a different end bit sequence. The outputs of the N-input gates are fed to the controller 206 through a selector that selects the output of the N-input gate that detects the end bit sequence of the test sequence currently being generated. The presettable descrambler 138 may include a similar arrangement.

Figure 5B:
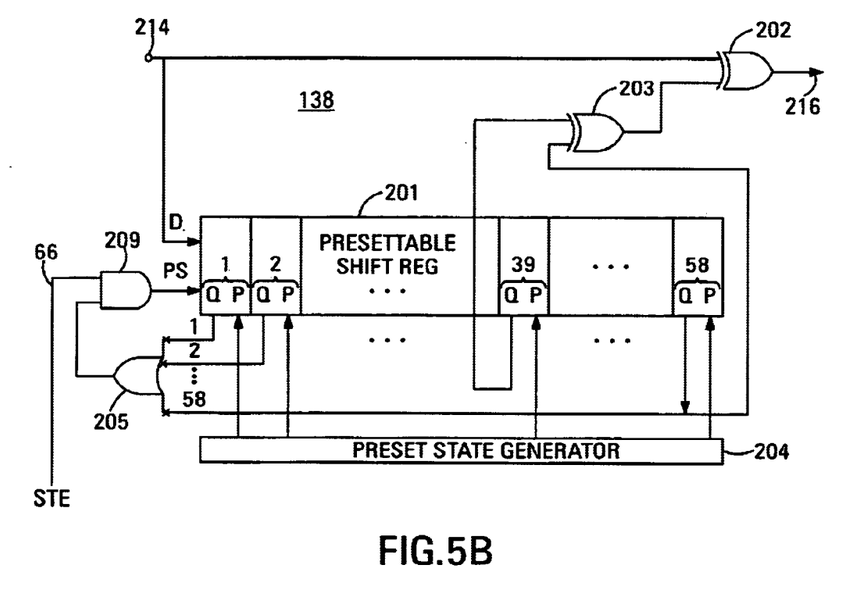
FIG. 5B is a block diagram showing an example of a serial version of the presettable descrambler of the data communication system shown in FIG. 4.

FIG. 5B is a block diagram showing an example of a serial version of the presettable descrambler 138. Elements of the presettable descrambler 138 that correspond to elements of the presettable scrambler 133 shown in FIG. 5A are indicated by the same reference numerals and will not be described again. In the presettable descrambler, the bits of the test sequence field received from the frame disassembler 37 via the input 214 are fed into the input D of the shift register 201. This corresponds to the test sequence field generated by the presettable scrambler shown in FIG. 5A being fed into the input D of the shift register. The recovered test sequence field is fed to the output 216 from the output of the XOR gate 202.

The output of the N-input AND gate 205 is connected to one input of the 2-input AND gate 209. The other input of the AND gate 209 receives the self test enable control signal STE via the control line 66. The output of the AND gate 209 is connected to the preset input PS of the shift register 201.

In the normal operating mode, the low state of the control signal STE holds the output of the AND gate 209 low, which holds the preset input PS of the shift register 201 low. This inhibits any presetting of the contents of the shift register 201 and the presettable descrambler 138 descrambles the scrambled payload fields using the polynomial $x^{58}+x^{39}+x^0$ to generate respective recovered payload fields that are output to the 66b/64b decoder 52.

In the self-test operating mode, the control signal STE changes to its high state, which enables the output of the N-input AND gate 209 to control the preset input PS of the shift register 201. The output of the AND gate 209 is initially low, so the presettable descrambler descrambles the received test sequence fields resulting until the last 58 bits received by the presettable descrambler 138 are the end bit sequence.

When the last 58 bits received are the end bit sequence, the end bit sequence additionally appears on the data outputs Q of the shift register 201. This causes the output of the N-input AND gate 205, the output of the AND gate 209 and the preset input PS of the shift register 201 all to go high. The high state of the preset input loads the state on the preset input P of each stage into the stage, which changes the states of the data outputs Q of the shift register. This causes the output of the N-input AND gate 205 to go low. The low states of the outputs of the AND gates 205 and 209 return the preset input PS of the shift register to its low state. This allows the presettable descrambler to descramble the received test sequence fields starting with the shift register 201 preset in the preset state. This preset sequence repeats every time the end bit sequence is received.

It should be noted that the preset transition that takes place in the presettable descrambler 138 when the end bit sequence is receive takes place seamlessly and noiselessly.

Figure 6:
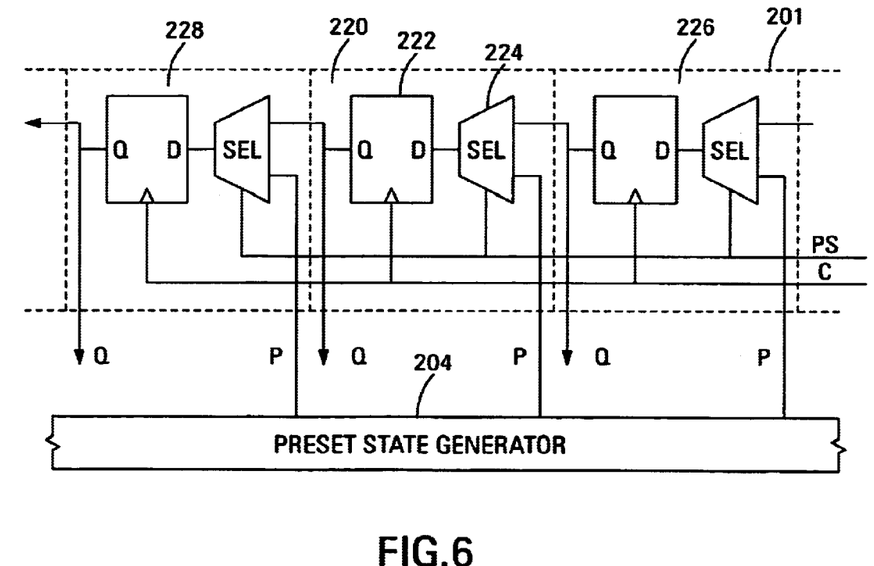
FIG. 6 is a block diagram showing an example of three consecutive stages of the shift register that forms part of the presettable scrambler and the presettable descrambler shown in FIGS. 5A and 5B, respectively.

FIG. 6 is a block diagram showing an example of three consecutive stages that form part of the shift register 201 shown in FIGS. 5A and 5B. In an embodiment, the shift register is composed of 58 identical stages. The stage 220 will be described. The stage 220 is composed of the delay element 222 and the two-input selector 224. The output of the selector is connected to the data input D of the delay element. One input of the selector is connected to the output of the previous stage 226. The other input is connected to the output of the preset state generator 204 corresponding to the stage 220. The control input of the selector is connected via the preset line to the preset input PS of the shift register.

The data output Q of the delay element 222 is connected to the next stage 228 and also to an input of the N-input AND gate 205 shown in FIGS. 5A and 5B. The clock input of the delay element is connected via the clock line to the clock input C of the shift register 201.

When the preset input PS is low, the selector 224 connects the output Q of the previous stage 226 to the data input D of the delay element 222. On the next clock cycle, the state on the data input D is clocked to the output of the delay element 222 and thus to the next stage 228. When the preset input PS is high, the selector 224 connects the output of the preset state generator 204 corresponding to the stage 220 to the data input D of the delay element. On the next clock cycle, the preset state corresponding to the stage 220 is clocked to the output Q of the delay element and to the input of the next stage 228. Thus, the output of the stage 220 is set to the preset state.

Figure 7:
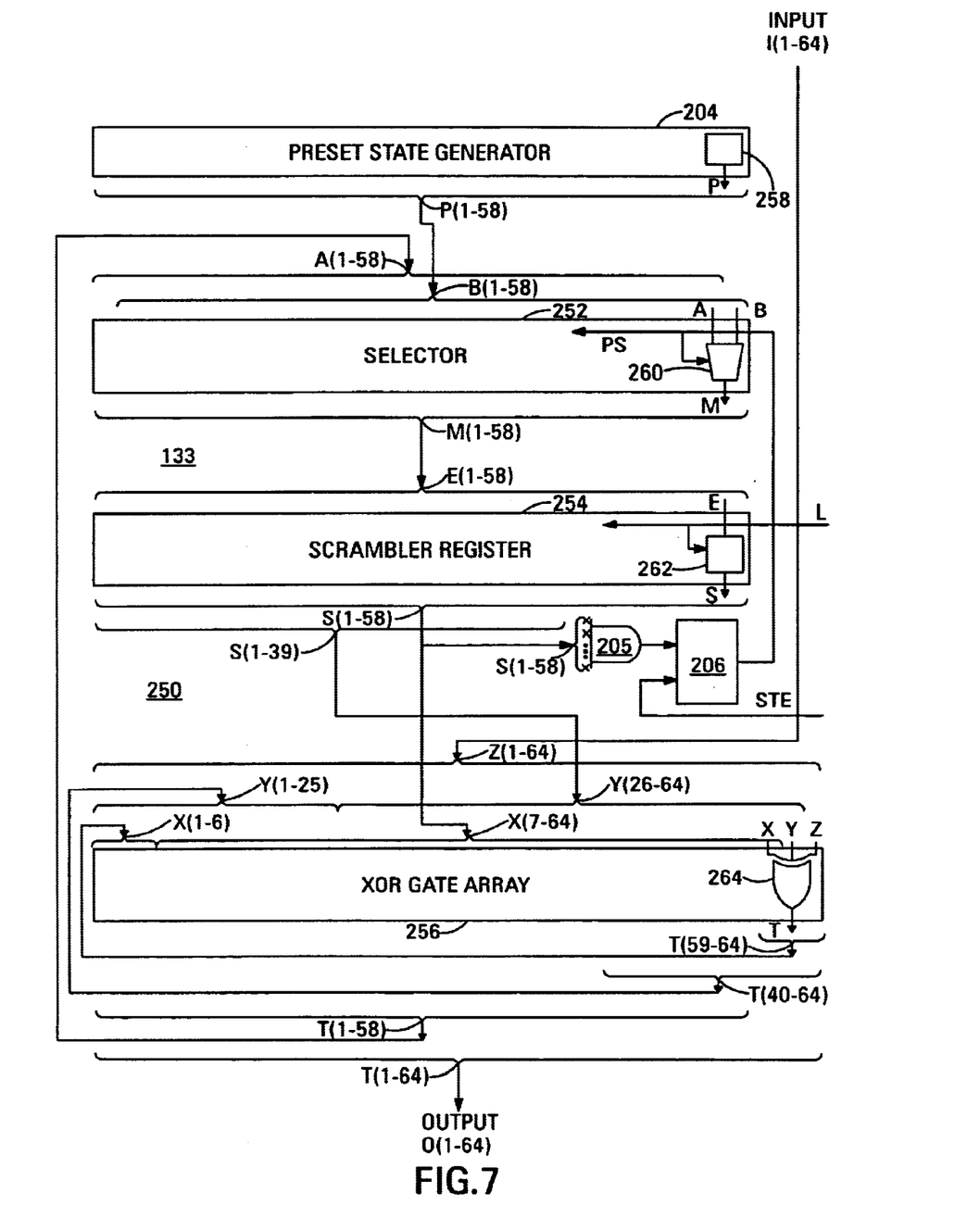
FIG. 7 is a block diagram of an example of a parallel version of the presettable scrambler of the data communication system shown in FIG. 4.

FIG. 7 is a block diagram of an example of a parallel version of the presettable scrambler 133 shown in FIG. 5A. Elements of the presettable scrambler shown in FIG. 7 that correspond to those of the presettable scrambler shown in FIG. 5A are indicated using the same reference numerals and will not be described again here.

An example 250 of a 58-bit parallel presettable scrambler that scrambles a 64-bit payload field using the polynomial $x^{58}+x^{39}+x^0$ to generate a 64-bit scrambled payload field will be described. Modifications to the example shown to use a different polynomial and/or to scramble payload fields of a different size will be apparent to a person of ordinary skill in the art.

The presettable scrambler 250 is composed of the selector 252, the scrambler register 254 and the XOR gate array 256. The presettable scrambler additionally includes the preset state generator 204, the N-input AND gate 205 and the controller 206, described above.

The preset state generator is composed of 58 state generators numbered 1–58. An exemplary state generator is shown at 258. The state generator has an output P that is set to 0 or to 1 in accordance with the corresponding digit of the 58-bit preset state. The remaining 57 state generators have the same structure and operation.

The selector 252 is composed of 58 two-input changeover switches numbered 1–58. An exemplary switch is shown at 260. The switch 260 has two inputs A and B, an output M and a control input. The switch connects the input A to the output M when the preset line PS is not asserted, and connects the input B to the output M when the preset line PS is asserted. The remaining 57 switches have the same structure and operation.

The scrambler register 254 is composed of 58 latches numbered 1–58. An exemplary latch is shown at 262. The latch 262 has an input E, an output S and a control input. The latch transfers the state at its input E to its output S when the load signal on the load line L is asserted on the arrival of a new payload field at the input of the presettable scrambler 250. The remaining 57 latches have the same structure and operation.

The XOR gate array 256 is composed of 64 three-input exclusive-OR (XOR) gates 1–64. An exemplary XOR gate is shown at 265. The XOR gate 265 has an input X, an input Y, an input Z and an output T. The remaining 63 XOR gates have the same structure and operation.

The inputs A of the switches 1–58, indicated by A(1–58), of the selector 252 are connected in order to the outputs T of the XOR gates 1–58 of the XOR gate array 256, indicated by T(1–58). The inputs B of the switches 1–58, indicated by (B-1–58) of the selector are connected in order to the outputs P of the state generators 1–58, indicated by P(1–58), of the preset state generator 204. The control inputs of the switches 1–58 of the selector are all connected to the preset line PS. The preset line is connected to the output of the controller 206. The outputs M of the switches 1–58, indicated by M(1–58), of the selector are connected in order to the inputs E of the latches 1–58 indicated by E(1–58), of the scrambler register 254.

The control inputs of the latches 1–58 of the scrambler register 254 are all connected to the load line L. The load line is asserted each time the presettable scrambler 250 receives a new payload field from the 64b/66b encoder 50.

The outputs S of the latches 1–58, indicated by S(1–58), of the scrambler register 254 are connected in order to the inputs X of the XOR gates 7–64, indicated by X(7–64), of the XOR gate array 256. In addition, the outputs S of the latches 1–39, indicated by s(1–39) of the scrambler register are connected in order to the inputs Y of the XOR gates 26–64, indicated by Y(26–64), of the XOR gate array 256.

The input, indicated by I(1–64), from the payload field output of the 64b/66b encoder 50 is connected to the inputs Z of the XOR gates 1–64, indicated by Z(1–64) of the XOR gate array 256.

The outputs T of the XOR gates 1–64, indicated by T(1–64) of the XOR gate array 256 are connected to the output, indicated by O(1–64), of the presettable scrambler 250. Additionally, the outputs T of the XOR gates 40–64, indicated by T(40–64), of the XOR gate array are connected to the inputs Y of the XOR gates 1–25, indicated by Y(1–25), of the XOR gate array. Finally, the outputs T of the XOR gates 59–64, indicated by T(59–64), of the XOR gate array are connected to the inputs X of the XOR gates 1–6, indicated by X(1–6), of the XOR gate array.

In the normal operating mode of the data communication system 100, the low state of the control signal STE holds the output of the controller 206 low, which holds the preset line PS of the selector 252 low. This connects the outputs T of the XOR gates 1–58 of the gate array 256 to the outputs M of switches 1–58, respectively, of the selector, and thence to the inputs E of the latches 1–58 of the scrambler register 254. No resetting of the presettable scrambler 250 occurs and the presettable scrambler scrambles the payload fields using the polynomial $x^{58}+x^{39}+x^0$.

In the self-test operating mode, the presettable scrambler 250 receives the seed payload field at its input I. The control signal STE is in its high state. The change of state of the control signal STE causes the output of the controller 206 to change to its high state for one clock cycle. The high state of the preset line PS causes the selector 252 to connect the outputs P of elements 1–58 of the preset state generator 252 to the outputs M of switches 1–58, respectively, of the selector, and thence to the inputs E of the latches 1–58 of the scrambler register 254. The Load signal thus loads the outputs of the preset state generator into latches 1–58 of the scrambler register. This sets the states of the outputs T of the XOR gates providing the output of presettable scrambler 250. In the example described above, the outputs are set to $(00\ 00\ 00\ 00\ 00\ 28\ FF\ 03)_H$.

When the preset line PS returns to its low state, the outputs of the XOR gates 1–58 of the XOR gate array 256 are once more fed to the outputs M of switches 1–58, respectively, of the selector 252, and thence to the inputs E of the latches 1–58 of the scrambler register 254. However, due to the preset operation, the outputs of the XOR gates differ from what they were before the preset. The presettable scrambler 250 scrambles the Local Fault payload field starting with the scrambler register 254 preset to the preset state.

The presettable scrambler 250 continues to scramble the Local Fault payload field to generate successive fields of the test sequence until the states of the outputs S of the scrambler register 254 correspond to the end bit sequence described above.

When the states of the outputs S of the scrambler register 254 correspond to the end bit sequence, the output of the N-input AND gate 205 changes state. This causes the output of the controller 206 and the preset line PS of the scrambler register both to go high. The high state of the preset line once more loads the preset state output by the preset state generator 204 into the scrambler register. The preset state changes the states of the outputs of the scrambler register, which causes the output of the N-input AND gate to go low. The low state of the output of the AND gate 205 returns the output of the controller and the preset input PS of the scrambler register to their low states, and the cycle repeats.

It will be apparent to the person of ordinary skill in the art that a parallel presettable descrambler can be made by rearranging the parallel presettable scrambler 250 in a manner analogous to the way the serial presettable scrambler shown in FIG. 5A is rearranged to make the serial presettable descrambler shown in FIG. 5B.

The embodiments of the data communication system 100, transmitter 120 and receiver 122 described in this disclosure may be constructed from small-scale or large-scale integrated circuits, suitably-configured ASICs, gate arrays and other suitable hardware.

The invention has been described with reference to an example in which the 64b/66b encoder 50 serves as the source of the seed payload field. However, this is not critical to the invention. The transmitter 120 can include a source of the seed payload field independent of the 64b/66b encoder. For example, a 64-channel 2-input selector (not shown) can be located between the payload output of the 64b/66b encoder and the input of the presettable scrambler 133. One set of inputs of the selector is connected to the output of the 64b/66b encoder, the other set of inputs is connected to receive the seed payload field, e.g., the Local Fault payload field. A generator similar to the preset state generator 204 shown in FIG. 7 can be used as the source of the seed payload field, for example. The outputs of the selector are connected to the input of the presettable scrambler. The selector is controlled by the control signal STE to feed the seed payload field to the presettable scrambler when the control signal STE is asserted.

The invention has been described with reference to examples that employ certain logic states. However, it will be apparent to the person of is ordinary skill in the art that the functions and structures described in this disclosure can be accomplished using different logic states.

Although this disclosure describes illustrative embodiments of the invention in detail, it is to be understood that the invention is not limited to practiced within the scope of the invention defined by the appended claims.

We claim:

1. A method for self-testing a data communication system that includes a presettable scrambler and a complementary presettable descrambler, the method comprising:

presetting the presettable scrambler to a preset state;

scrambling a seed payload field using the presettable scrambler to generate fields of a test sequence;

transmitting the fields of the test sequence and receiving corresponding received test sequence fields;

descrambling the received test sequence fields using the presettable descrambler to generate respective recovered test sequence fields; and detecting differences between the recovered test sequence fields and the seed payload field as errors.

2. The method of claim 1, in which, in presetting the presettable scrambler and scrambling the seed payload field, a combination of the preset state and the seed payload field causes the presettable scrambler to generate the test sequence to include a desired bit pattern.

3. The method of claim 2, in which, in which, in scrambling the seed payload field, a sequence of different seed payload fields is scrambled to generate the test sequence to include corresponding different desired bit patterns.

4. The method of claim 3, in which:

in scrambling a seed payload field, a first one of the seed payload fields is scrambled to generate a first test sequence having a first end bit sequence; and presetting the presettable scrambler to a preset state includes:

detecting the first end bit sequence, and, when the first end bit sequence is detected:

presetting the presettable scrambler to the preset state, in scrambling the seed payload field, changing the one of the seed payload fields that is scrambled from the first one of the seed payload fields to a second one of the seed payload fields to generate a second test sequence having a second end bit sequence, and in detecting the first end bit sequence, changing the end bit sequence that is detected from the first end bit sequence to the second end bit sequence.

5. The method of claim 1, in which, in scrambling a seed payload field, the seed payload field is an Idle payload field.

6. The method of claim 1, in which, in scrambling a seed payload field, the seed payload field is a Local Fault payload field.

7. The method of claim 1, in which presetting the presettable scrambler to a preset state includes:

detecting an end bit sequence in the test sequence; and presetting the presettable scrambler to the preset state when the end bit sequence is detected.

8. The method of claim 7, additionally comprising:

detecting the end bit sequence in the recovered test sequence fields; and presetting the presettable descrambler to the preset state when the end bit sequence is detected.

9. The method of claim 1, in which:

transmitting the fields of the test sequence includes forming frames, each of the frames including synchronizing bits and one of the fields of the test sequence; and receiving the corresponding received test sequence fields includes synchronizing to the synchronizing bits.

10. The method of claim 1, in which:
the test sequence is part of a larger test sequence having a cycle time substantially greater than a desired cycle time, the larger test sequence having an end; and
the method additionally includes presetting the presettable scrambler to the preset state prior to the end of the larger test sequence to provide the test sequence with the desired cycle time.

11. A method of generating a test sequence in a data transmitter that includes a scrambler, the method comprising:
in a normal operating mode:
scrambling payload fields using the scrambler to generate respective scrambled payload fields, and
transmitting the scrambled payload fields; and
in a self-test operating mode:
scrambling a seed payload field using the scrambler to generate fields of the test sequence, and
transmitting the fields of the test sequence.

12. The method of claim 11, in which:
the scrambler is a presettable scrambler;
the method additionally comprises presetting the presettable scrambler to a preset state; and
in presetting the presettable scrambler and in scrambling the seed payload field, a combination of the preset state and the seed payload field causes the presettable scrambler to generate the test sequence to include a desired bit pattern.

13. The method of claim 12, in which, in which, in scrambling a seed payload field, a sequence of different seed payload fields is scrambled using the presettable scrambler to generate the test sequence to include corresponding different desired bit patterns.

14. The method of claim 12, in which presetting the presettable scrambler to a preset state includes:
detecting an end bit sequence in the test sequence; and
presetting the scrambler to the preset state when the end bit sequence is detected.

15. The method of claim 11, in which transmitting the fields of the test of the test sequence includes forming frames, each of the frames including synchronizing bits and one of the fields of the test sequence.

16. A method of self-testing a data receiver that includes a descrambler, the method comprising:
in a normal operating mode, receiving scrambled payload fields as received payload fields, and descrambling the received payload fields using the descrambler; and
in a self-test operating mode:
receiving received test sequence fields generated by scrambling a seed payload field,
descrambling the received test sequence fields using the descrambler to generate respective recovered test sequence fields, and
detecting differences between the recovered test sequence fields and the seed payload field as errors.

17. The method of claim 16, in which:
the descrambler is a presettable descrambler; and
the method additionally comprises presetting the presettable descrambler to a preset state.

18. The method of claim 17, in which presetting the presettable descrambler to a preset state includes:
detecting an end bit sequence in the received test sequence fields; and
presetting the presettable descrambler to the preset state when the end bit sequence is detected.

19. A data communication system having a built-in self-test facility, the data communication system comprising:
a seed payload field source;
a presettable scrambler including an input connected to the seed payload field source and an output coupled to a data transmission medium, the presettable scrambler being presettable to a preset state;
a presettable descrambler including an input coupled to the transmission medium and an output; and
an error detector including an input connected to the output of the presettable descrambler, the error detector operating to generate an error indication when a recovered test sequence field output by the presettable descrambler differs from the seed payload field.

20. The data communication system of claim 19, in which a combination of the seed payload field and the preset state of the presettable scrambler is selected to cause the presettable scrambler to output at least one desired bit pattern.

21. The data communication system of claim 20, in which the seed payload field generator is configured to generate a sequence of different seed payload fields to cause the presettable scrambler to output corresponding different desired bit patterns.

22. The data communication system of claim 19, in which the seed payload field is an Idle payload field.

23. The data communication system of claim 19, in which the seed payload field is a Local Fault payload field.

24. The data communication system of claim 19, additionally comprising:
a detector that detects an end bit sequence generated by the presettable scrambler; and
a controller that operates in response to the detector to preset the presettable scrambler to the preset state.

25. The data communication system of claim 24, additionally comprising:
an additional detector that detects the end bit sequence at the input of the presettable descrambler; and
an additional controller that operates in response to the detector to preset the presettable descrambler to the preset state.

26. The data communication system of claim 19, in which:
the presettable scrambler generates fields of a test sequence by scrambling the seed payload field; and
the data communication system additionally comprises a frame assembler interposed between the output of the presettable scrambler and the transmission medium, the frame assembler operating to form frames, each of the frames including synchronizing bits and one of the fields of the test sequence.

27. A data transmitter having a built-in self-test facility, the data transmitter comprising, comprising:
a payload field source;
a seed payload field source; and
a scrambler that operates in a normal operating mode to receive payload fields from the payload field source and to scramble the payload fields to generate respective scrambled payload fields for transmission, and that alternatively operates in a self-test operating mode to receive a seed payload field from the seed payload field source and to scramble the seed payload field to generate fields of a test sequence for transmission.

28. The data transmitter of claim 27, in which:

the scrambler is a presettable scrambler capable of being preset to a preset state; and a combination of the preset state and the seed payload field causes the presettable scrambler to generate the test sequence to include a desired bit pattern.

29. The data transmitter of claim 28, in which, the seed payload field generator is configured to generate a sequence of different seed payload fields to cause the presettable scrambler to generate the test sequence to include corresponding different desired bit patterns.

30. The data transmitter of claim 28, additionally comprising:

a detector that detects an end bit sequence in the test sequence; and a controller that presets the presettable scrambler to the preset state when the detector detects the end bit sequence.

31. The data transmitter of claim 27, additionally comprising a frame assembler coupled to the scrambler and configured to form frames, each of the frames including synchronizing bits and one of the fields of the test sequence.

32. A data receiver having a built-in self-test facility, the data receiver comprising:

a descrambler including an output, the descrambler operating in a normal operating mode to descramble received payload fields to generate respective recovered payload fields, and alternatively operating in a self-test operating mode to descramble received test sequence fields generated by scrambling a seed payload field generator to generate respective recovered test sequence fields; and an error detector including an input connected to the output of the descrambler, the error detector operating to generate error indications when the recovered test sequence fields differ from the seed payload field.

33. The data receiver of claim 32, in which:

the descrambler is a presettable descrambler; and the data receiver additionally comprises a controller that operates occasionally to preset the presettable descrambler to preset state.

34. The data receiver of claim 33, in which:

the controller includes a detector operating to detect an end bit sequence in the recovered test sequence fields; and the controller operates to preset the presettable scrambler to the preset state when the detector detects the end bit sequence.

* * * * *